(12) United States Patent
Luo et al.

(10) Patent No.: US 12,470,912 B2
(45) Date of Patent: Nov. 11, 2025

(54) COMMUNICATION METHOD, DEVICE, AND SYSTEM

(71) Applicant: HUAWEI TECHNOLOGIES CO., LTD., Guangdong (CN)

(72) Inventors: Haiyan Luo, Shanghai (CN); Yuxuan Ye, Shanghai (CN); Yan Wang, Beijing (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/912,122

(22) Filed: Jun. 25, 2020

(65) Prior Publication Data

US 2020/0329365 A1 Oct. 15, 2020

Related U.S. Application Data

(63) Continuation of application No. PCT/CN2018/124826, filed on Dec. 28, 2018.

(30) Foreign Application Priority Data

Dec. 29, 2017 (CN) .......................... 201711483393.6

(51) Int. Cl.
*H04W 8/18* (2009.01)
*H04W 36/00* (2009.01)

(52) U.S. Cl.
CPC ....... *H04W 8/186* (2013.01); *H04W 36/0055* (2013.01)

(58) Field of Classification Search
CPC .............. H04L 41/0803; H04W 24/04; H04W 36/0055; H04W 76/15; H04W 88/085
See application file for complete search history.

(56) References Cited

U.S. PATENT DOCUMENTS

| | | | | |
|---|---|---|---|---|
| 2009/0296609 | A1* | 12/2009 | Choi ......................... | H04L 5/14 370/281 |
| 2013/0343297 | A1* | 12/2013 | Dinan ............... | H04W 56/0045 370/329 |
| 2015/0215929 | A1* | 7/2015 | Damnjanovic ....... | H04W 72/21 370/241 |

(Continued)

FOREIGN PATENT DOCUMENTS

| | | |
|---|---|---|
| CN | 102547848 A | 7/2012 |
| CN | 104780017 A | 7/2015 |

(Continued)

OTHER PUBLICATIONS

U.S. Appl. No. 62/166,62 for US Pub 20180359800 A1, Jun. 7, 2017.*

(Continued)

*Primary Examiner* — Wutchung Chu
*Assistant Examiner* — Berhanu D Belete
(74) *Attorney, Agent, or Firm* — Fish & Richardson P.C.

(57) ABSTRACT

Embodiments of this application provide communications methods and apparatuses. In an embodiment, a communications method comprises: sending, by a centralized unit (CU) to a distributed unit (DU), a full configuration indication; and receiving, by the CU from the DU, a cell group configuration generated based on the full configuration indication.

12 Claims, 3 Drawing Sheets

(56) References Cited

U.S. PATENT DOCUMENTS

| | | | | |
|---|---|---|---|---|
| 2015/0215987 A1* | 7/2015 | Kim | ...................... | H04W 76/20 370/329 |
| 2015/0222604 A1* | 8/2015 | Ylonen | ..................... | H04L 9/14 713/171 |
| 2015/0304891 A1* | 10/2015 | Dinan | ............... | H04W 36/0077 370/331 |
| 2017/0196022 A1* | 7/2017 | Yi | ..................... | H04W 74/0833 |
| 2017/0222876 A1* | 8/2017 | Van Der Velde | ... | H04W 12/043 |
| 2017/0250736 A1* | 8/2017 | Chae | ....................... | H04B 7/024 |
| 2017/0295524 A1 | 10/2017 | Malkamaki et al. | | |
| 2017/0311211 A1* | 10/2017 | Chiba | ................ | H04W 36/0069 |
| 2017/0359848 A1* | 12/2017 | Tenny | ................... | H04W 36/04 |
| 2018/0027457 A1* | 1/2018 | Xu | .................... | H04W 36/0064 370/331 |
| 2018/0049224 A1* | 2/2018 | Dinan | .................. | H04W 72/23 |
| 2018/0049265 A1* | 2/2018 | Liu | ..................... | H04W 88/085 |
| 2018/0279358 A1* | 9/2018 | Babaei | .............. | H04W 72/0453 |
| 2018/0288826 A1* | 10/2018 | Chiba | .................. | H04W 76/34 |
| 2018/0338277 A1* | 11/2018 | Byun | ..................... | H04W 88/08 |
| 2018/0359149 A1* | 12/2018 | Shaheen | ........... | H04W 72/0453 |
| 2018/0359800 A1* | 12/2018 | Wu | ....................... | H04W 76/15 |
| 2019/0053319 A1* | 2/2019 | Jeon | ..................... | H04J 11/0076 |
| 2019/0089579 A1* | 3/2019 | Sang | ................... | H04W 36/305 |
| 2019/0098529 A1* | 3/2019 | Park | .................. | H04W 28/0231 |
| 2019/0098682 A1* | 3/2019 | Park | ......................... | H04L 1/08 |
| 2019/0124181 A1* | 4/2019 | Park | ..................... | H04W 80/10 |
| 2019/0124572 A1* | 4/2019 | Park | ................. | H04W 72/0446 |
| 2019/0132790 A1* | 5/2019 | Lee | ....................... | H04W 48/18 |
| 2019/0150037 A1* | 5/2019 | Mildh | ............... | H04W 36/0005 370/331 |
| 2019/0150220 A1* | 5/2019 | Byun | .................... | H04W 76/11 370/329 |
| 2019/0182881 A1* | 6/2019 | Teyeb | ..................... | H04L 5/001 |
| 2019/0222291 A1* | 7/2019 | Wang | .................. | H04B 7/0695 |
| 2019/0223251 A1* | 7/2019 | Jiang | .................... | H04W 80/02 |
| 2019/0274076 A1* | 9/2019 | Kim | ....................... | H04W 24/10 |
| 2019/0342148 A1* | 11/2019 | Hong | ................... | H04W 76/15 |
| 2019/0357097 A1* | 11/2019 | Rugeland | .......... | H04W 36/0069 |
| 2019/0380067 A1* | 12/2019 | Rosa | .................... | H04W 36/0061 |
| 2020/0120572 A1* | 4/2020 | Fiorani | ................ | H04W 36/06 |
| 2020/0389930 A1* | 12/2020 | Park | ..................... | H04W 76/15 |
| 2021/0058995 A1* | 2/2021 | Sharma | ............ | H04W 12/0431 |
| 2021/0258214 A1* | 8/2021 | Toeda | ............... | H04W 36/0064 |
| 2021/0281552 A1* | 9/2021 | Van Der Velde | ..... | H04W 76/15 |
| 2022/0279412 A1* | 9/2022 | Wu | ....................... | H04W 36/24 |

FOREIGN PATENT DOCUMENTS

| | | | | |
|---|---|---|---|---|
| CN | 105101312 A | 11/2015 | | |
| CN | 106162730 A | 11/2016 | | |
| WO | WO-2018053852 A1 * | 3/2018 | ............... | H04L 5/00 |

OTHER PUBLICATIONS

3GPP TS 38.473 V1.0.0 (Dec. 2017), "3rd Generation Partnership Project; Technical Specification Group Radio Access Network; NG-RAN; F1 application protocol (F1AP) (Release 15)," Dec. 2017, 92 pages.

3GPP TS 38.401 V1.0.0 (Dec. 2017), "3rd Generation Partnership Project; Technical Specification Group Radio Access Network; NG-RAN; Architecture description (Release 15)," Dec. 2017, 22 pages.

Ericsson, "Offline#21 Full configuration in EN-DC (Ericsson)," 3GPP TSG-RAN WG2 Meeting #100, R2-1714207, Reno, US, Nov. 27-Dec. 1, 2017, 6 pages.

Ericsson, "Offline#21 Full configuration in EN-DC (Ericsson)," 3GPP TSG-RAN WG2 Meeting #100, R2-1714228, Reno, US, Nov. 27-Dec. 1, 2017, 6 pages.

PCT International Search Report and Written Opinion issued in International Application No. PCT/CN2018/124826 on Mar. 19, 2019, 16 pages (with English translation).

Office Action issued in Chinese Application No. 201711483393.6 on Mar. 12, 2021, 7 pages.

3GPP TS 38.401 V0.4.1 (Oct. 2017), "3rd Generation Partnership Project; Technical Specification Group Radio Access Network;NG-RAN; Architecture description (Release 15)," Oct. 2017, 25 pages.

Ericsson, "Transfer of L1-L2 configuration for EN-DC," 3GPP TSG RAN WG3 Meeting #98, Tdoc R3-174786, Reno, Nevada, USA, Nov. 27-Dec. 1, 2017, 3 pages.

Extended European Search Report issued in European Application No. 18896533.9 on Feb. 3, 2021, 13 pages.

Huawei, "CR to 38.473 on full configuration indication over F1," 3GPP TSG-RAN WG3 meeting#99bis, R3-182128, Sanya , China, Apr. 16-20, 2018, 7 pages.

Huawei, "Full configuration indication over F1," 3GPP TSG-RAN WG3 meeting#99bis, R3-182127, Sanya , China, Apr. 16-20, 2018, 2 pages.

HTC et al., "Support of full configuration per CG," 3GPP TSG-RAN WG2#99bis, R2-1711666, Prague, Czech Republic, Oct. 9-13, 2017, 5 pages.

NTT Docomo, Inc., "Full configuration over F1," 3GPP TSG-RAN WG3 RAN3-AH-1807, R3-183896, Montreal, Canada, Jul. 2-6, 2018, 5 pages.

RAN3, "LS on RRC Information exchange for F1 UE Context Management," 3GPP TSG-RAN3#98, R3-175042, Reno, NV, USA, Nov. 27-Dec. 1, 2017, 2 pages.

Ericsson, "Full configuration in EN-DC", 3GPP TSG-RAN WG2 #100, R2-1713390, Reno, NV, USA, Nov. 27-Dec. 1, 2017, 9 pages.

KT Corp., "Considerations for F1 Setup Procedure," 3GPP TSG RAN WG3 Meeting #98, R3-174854, Reno, NV, USA, Nov. 27-Dec. 1, 2017, 4 pages.

3GPP TS 38.331 V1.0.0 (Dec. 2017), "3rd Generation Partnership ProjectTechnical Specification Group Radio Access NetworkNR-Radio Resource Control (RRC)Protocol specification(Release 15)," Dec. 2017, 187 pages.

Office Action issued in Japanese Application No. 2020-536218 on Jul. 5, 2021, 7 pages (with English translation).

* cited by examiner

COMMUNICATION METHOD, DEVICE, AND SYSTEM

CROSS-REFERENCE TO RELATED APPLICATIONS

This application is a continuation of International Application No. PCT/CN2018/124826, filed on Dec. 28, 2018, which claims priority to Chinese Patent Application No. 201711483393.6, filed on Dec. 29, 2017, the disclosures of the aforementioned applications are hereby incorporated by reference in their entireties.

TECHNICAL FIELD

This application relates to the communications field, and more specifically, to, for example, a communication method, a device and a system.

BACKGROUND

Figure 1:
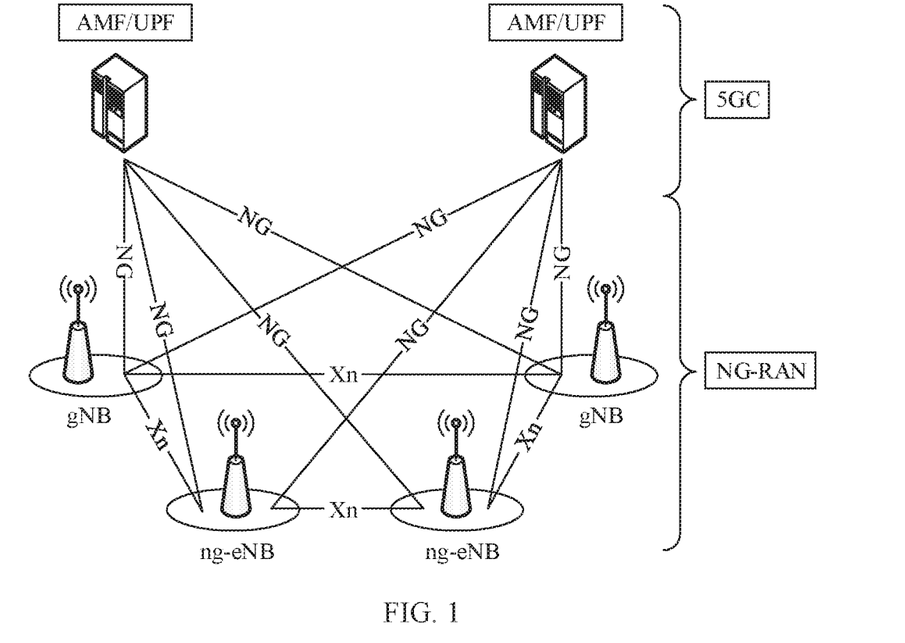
FIG. 1 is a schematic block diagram of a 5G system according to an embodiment of this application.
Figure 2:
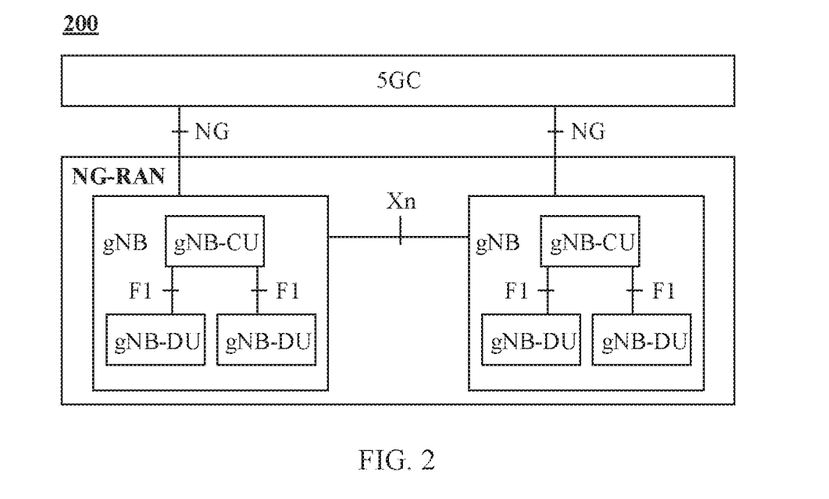
FIG. 2 is a schematic block diagram of a 5G system according to an embodiment of this application.

In a next generation mobile communications system, for example, in a 5th generation mobile communications (the 5th generation mobile communications, 5G) system, a base station is referred to as a gNB or an ng-eNB, where the ng-eNB is a later evolved base station developed from a long term evolution (long term evolution, LTE) system base station (LTE eNB). For ease of description, the gNB is used to represent a base station in this specification. FIG. 1 is a schematic block diagram of a system 100 used as a 5G system. Interconnections between gNBs, between ng-eNBs, and between a gNB and an ng-eNB in a next generation radio access network (next generation radio access network, NG-RAN) are performed through Xn interfaces. A gNB and a 5G core network (5G core, 5GC) device are interconnected through an NG interface, and the ng-eNB and the 5GC device are interconnected through an NG interface. The 5GC device may be an access and mobility management function (access and mobility management function, AMF) entity or a user plane function (user plane function, UPF) entity. The AMF is mainly responsible for an access management function, and the UPF is mainly responsible for a session (session) management function. A base station usually includes a logical function protocol layer such as a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, or a physical layer (physical layer, PHY). A next generation base station (for example, a gNB) evolves from a conventional base station architecture. FIG. 2 is a schematic block diagram of a 5G system 200. The system 200 includes a 5GC and an NG-RAN. In the NG-RAN, a base station gNB may include a centralized unit (centralized unit, CU) and a distributed unit (distributed unit, DU). A CU-DU architecture may be understood as functional split of a base station in a conventional access network. Some functions of a conventional base station are deployed on the CU, and remaining functions are deployed on the DU. A plurality of DUs may share one CU to reduce costs and facilitate network capacity expansion. The CU exchanges information with the DU through an F1 interface. The gNB including the CU and the DU is a base station for another external network element.

Figure 3:
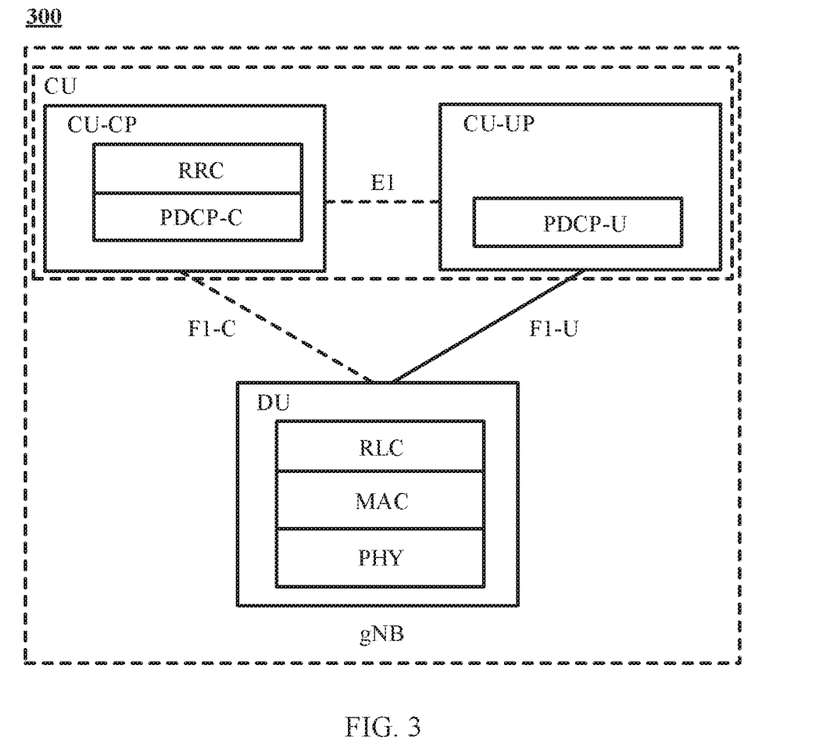
FIG. 3 is a schematic block diagram of a 5G system according to an embodiment of this application.

Further, in a schematic block diagram of an 5G system shown in FIG. 3, in a gNB, a central unit CU may be further divided into a CU control plane (CU control plane, CU-CP) and a CU user plane (CU user plane, CU-UP). The CU-CP is responsible for a control plane function, and mainly includes an RRC part and a PDCP control (PDCP-C) plane part. The PDCP-C is mainly responsible for encryption, decryption, integrity protection, data transmission, and the like of control plane data. The CU-UP is responsible for a user plane function and mainly includes SDAP and a PDCP-U. SDAP is mainly responsible for processing data of a core network and mapping a flow (flow) to a radio bearer. The PDCP-U is mainly responsible for encryption, decryption, integrity protection, header compression, sequence number maintenance, data transmission, and the like on a data plane. The CU-CP and the CU-UP are connected through an E1 interface. The CU-CP represents that the gNB is connected to the core network through an Ng interface. The CU-CP is connected to the DU through an F1-C (F1 control plane) interface. The CU-UP is connected to the DU through an F1-U (F1 user plane) interface. In another design, both the PDCP-C and the PDCP-C are on the CU-UP, and the RRC is on the CU-CP (not shown in FIG. 3).

In a dual connectivity (dual connectivity, DC) scenario, when a base station having a CU-DU architecture is used as a secondary base station (secondary node, SN), a DU cannot correctly obtain, through parsing, configuration information of a secondary cell group (secondary cell group, SCG) sent by a CU to the DU, and consequently a system error is caused.

SUMMARY

This application provides a communication method, a device, and a system, to resolve the problem in the Background that the system error is caused because when the base station having the CU-DU architecture is used as the secondary base station, the DU cannot not correctly obtain, through parsing, the configuration information of the secondary cell group sent by the CU to the DU.

According to a first aspect, an embodiment of this application provides a communication method. The communication method is performed in a communications system, the communications system includes a central unit and a distributed unit, and when the communications system runs, the following operations are performed:

The distributed unit DU sends cell group configuration information and/or a first instruction to the central unit CU. The cell group configuration information may be cell group configuration information with a full configuration. The first instruction may be used to notify the central unit CU of a status in which the distributed unit DU has performed full configuration. Alternatively, the distributed unit DU may trigger, by using the first instruction, the central unit CU to generate information related to the full configuration. For example, after receiving the first instruction, the CU generates radio bearer configuration information with a full configuration.

In an optional design, the distributed unit DU and the central unit CU form a secondary base station in a multi-connectivity scenario. The distributed unit sends, to a terminal device, a second instruction sent by the CU. The second instruction may be used to instruct the terminal device to perform a configuration update operation on the secondary base station.

In an optional design, the distributed unit DU sends a control message from the central unit CU to the terminal device. For example, the control message may be a radio resource control reconfiguration message, and the radio resource control reconfiguration message includes the radio bearer configuration information with the full configuration and/or the cell group configuration information with the full configuration. The radio bearer configuration information with the full configuration includes at least one of configuration information of a service data adaptation protocol layer and configuration information of a packet data convergence protocol layer. The radio bearer configuration information with the full configuration is generated by triggering the central unit CU based on the first instruction. The cell group configuration information with the full configuration includes at least one of configuration information of a radio link control layer, configuration information of a media access control layer, and configuration information of a physical layer.

In an optional design, the cell group configuration information with the full configuration and the first instruction are included in a message defined on a communications interface between the distributed unit and the central unit and sent; or the cell group configuration information with the full configuration and the first instruction are carried in an uplink data packet between the distributed unit and the central unit.

In an optional design, that the distributed unit DU sends a first instruction and/or cell group configuration information with a full configuration to the central unit CU needs to meet at least one of the following conditions:

1. The distributed unit DU receives reference configuration information of a secondary cell group SCG sent by the central unit, but the distributed unit DU cannot correctly obtain, through parsing, or understand configuration information of the secondary cell group SCG in the reference configuration information of the secondary cell group SCG.
2. The distributed unit DU (optionally, within a predetermined time) does not receive, from the central unit, configuration information of a secondary cell group SCG; or the distributed unit DU receives the reference configuration information of the secondary cell group SCG from the central unit, but the reference configuration information of the secondary cell group SCG does not include all or some of configuration information of the secondary cell group SCG.
3. The distributed unit DU receives an instruction from the central unit, where the instruction is used to notify that the distributed unit DU needs to perform full configuration.

This design scheme may be applicable to the following case: When the CU sends the reference configuration information of the SCG to the DU, but the DU cannot correctly identify the configuration information of the SCG in the reference configuration information of the SCG, the DU may determine to generate the cell group configuration information with the full configuration (specifically, for example, CellGroupConfig). The DU notifies the CU by sending instruction information, so that the CU also generates full configuration-based radio bearer configuration information (specifically, for example, radioBearerConfig). This also helps resolve a problem that a system error is caused because the secondary base station cannot understand configuration information of a source secondary base station.

In an optional design, the distributed unit has or includes only a radio link control layer, a media access control layer, and a physical layer. The central unit has or includes only a radio resource control layer, a service data adaptation protocol layer, and a packet data convergence protocol layer.

The communication method provided in the first aspect and the feasible designs of the communication method help resolve a problem that a system error is caused because the DU cannot correctly obtain, through parsing, the configuration information of the secondary cell group sent by the CU to the DU.

According to a second aspect, this application provides a communications device. The communications device includes at least one processor and a communications interface. The communications interface is used by the communications device to exchange information with another communications device. When a program instruction is executed in the at least one processor, the communications device is enabled to implement a function on the central unit or the distributed unit in the first aspect and the optional designs of the first aspect.

According to a third aspect, this application provides a computer program product. The computer program product has a program instruction. When the program instruction is directly or indirectly executed, a function on the central unit or the distributed unit in the first aspect and the optional designs of the first aspect is implemented.

According to a fourth aspect, this application provides a computer program storage medium. The computer program storage medium has a program instruction. When the program instruction is directly or indirectly executed, a function on the central unit or the distributed unit in the first aspect and the optional designs of the first aspect is implemented.

According to a fifth aspect, this application provides a chip system. The chip system includes at least one processor. When a program instruction is executed in the at least one processor, a function on the central unit or the distributed unit in the first aspect and the optional designs of the first aspect is implemented.

According to a sixth aspect, this application provides a communications system. The communications system includes the communications device described in the second aspect.

DESCRIPTION OF EMBODIMENTS

First, technical meanings of common parts are described for terms in the embodiments of this application.

Terms "first", "second", and the like in this application are merely used to distinguish different objects, and "first" and "second" do not limit an actual sequence or functions of objects modified by "first" and "second". For example, "first" and "second" in a "first instruction" and a "second instruction" are merely intended to distinguish between different instructions, and "first" and "second" do not limit an actual sequence or functions of the "first instruction" and the "second instruction". Expressions such as "example", "for example". "such as", "optional design", and "a design"

in this application are merely used to represent examples, instances, or descriptions. Any embodiment or design scheme described as "example", "for example", "such as", "optional design", or "a design" described in this application should not be construed as being more preferred or more advantageous than another embodiment or another design scheme. Specifically, using these words is intended to present a related concept in detail. Terms "uplink" and "downlink" in this application are used to describe a data transmission direction/an information transmission direction in a specific scenario. For example, an "uplink" direction is usually a direction in which data/information is transmitted from a terminal device to a network side, or a direction in which data/information is transmitted from a distributed unit to a central unit, and a "downlink" direction is usually a direction in which data/information is transmitted from a network side to a terminal device, or a direction in which data/information is transmitted from a central unit to a distributed unit. It may be understood that "uplink" and "downlink" are only used to describe data/information transmission directions, and no limitation is imposed on whether a device is a specific start point or a specific end point of data/information transmission.

Term "and/or" in this application merely describes an association relationship between objects and represents that three relationships may exist. For example, A and/or B may represent the following three cases: Only A exists, both A and B exist, and only B exists. In addition, unless otherwise specified, a character "/" in this application usually represents an "or" relationship between associated objects. A character "-" in this application is usually used to indicate that there is a correspondence/an association relationship/a mapping relationship/a collaboration relationship between objects before and after the character. For example, "-" in an expression "user plane function (PDCP-U) processed in a packet data convergence protocol" may be understood as representing a corresponding user plane function in a PDCP function.

Unless otherwise specified, a meaning of an expression similar to "an item includes at least one of the following: A, B, and C" in this application usually means that the item may be any one of the following: A; B; C; A and B; A and C; B and C; A, B, and C; A and A; A, A, and A; A, A, and B; A, A, and C; A, B, and A; A, C, and C; B and B; B, B, and B; B, B, and C; C and C; C, C, and C, and another combination of A, B, and C. The foregoing uses three elements A, B, and C as an example to describe an optional entry of the item. When the expression is "the item includes at least one of the following: A, B, . . . , and X", in other words, more elements are included in the expression, an entry to which the item is applicable may also be obtained according to the foregoing rule.

Names may be assigned to various objects in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects of the technical terms reflected/achieved in the technical solutions.

In this application, the terminal device may include the following forms: user equipment (User Equipment, UE), an access terminal, a subscriber unit, a subscriber station, a mobile station, a mobile console, a remote station, a remote terminal, a mobile device, a user terminal, a terminal, radio communications equipment, a user agent, or a user apparatus. The terminal device may be a station (Station, ST) in a WLAN, may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device or a computing device having a wireless communication function, another processing device connected to a wireless modem, a vehicle-mounted device, a wearable device and a next generation communications system, for example, a terminal device in a 5G network or a terminal device in a future evolved public land mobile network (Public Land Mobile Network, PLMN). The terminal device may alternatively be a wearable device. The wearable device may also be referred to as a wearable intelligent device, which is a generic term of wearable devices that can be worn and are developed based on intelligent design of routine wearing by using a wearable technology, such as glasses, gloves, watches, clothes, or shoes. The wearable device is a portable device that is directly worn on a body or integrated into clothes or an accessory of a user. The terminal device may alternatively be a terminal device in an internet of things (internet of things, IoT) system. IoT is an important component in development of future information technologies. A main technical feature of the IoT is to connect an object to a network by using a communications technology, to implement an intelligent network of human-machine interconnection and machine-to-machine interconnection. In the embodiments of this application, an example in which the terminal device is UE is used to describe solutions in the embodiments. However, it may be understood that the terminal device in the embodiments of this application is not limited to the UE.

A network architecture and a service scenario described in the embodiments of this application are intended to help readers clearly understand the technical solutions in the embodiments of this application, and do not constitute a limitation on the technical solutions provided in the embodiments of this application. A person of ordinary skill in the art may know that, with the evolution of the network architecture and the emergence of a new service scenario, the technical solutions provided in the embodiments of this application are also applicable to a similar technical problem.

In a handover process of the UE based on a scenario of evolved universal terrestrial radio access new radio dual connectivity (evolved universal terrestrial radio access new radio dual connectivity. EN-DC), for example, when the UE performs DC to a source base station, and the UE also performs DC to a target base station, in a handover process, a source-side base station sends configuration information related to the source base station to a target-side base station. If a master base station (master node, MN) in the target-side base station can correctly obtain, through parsing, configuration information of a master cell group (master cell group, MCG) in the configuration information related to the source base station, the target MN sends configuration information of a secondary cell group (secondary cell group, SCG) to a secondary base station (secondary node, SN) in the target-side base station. If the target SN cannot correctly obtain, through parsing, the configuration information of the SCG, the target SN instructs, by sending instruction information, the target MN to use a full configuration of the SCG. When the target MN receives the instruction information from the target SN, the target MN carries a full configuration instruction in a control message (for example, an RRC reconfiguration message in an LTE system) to be sent to the UE. In this case, the full configuration instruction may specifically be an en-DC-release instruction or an scg-ConfigReleaseNR instruction.

For a scenario in which a logic base station has a CU-DU architecture, when the base station having the CU-DU architecture is used as a secondary base station, a CU sends, to a DU, reference configuration information (for example, SCG-ConfigInfo) of a secondary cell group (secondary cell group, SCG) provided by a master base station. The reference configuration information of the SCG includes at least one of the following: configuration information of a master cell group (master cell group, MCG), configuration information of the SCG, capability information of UE, and the like. The configuration information of the MCG includes at least one of the following: radioResourceConfigDedMCG defined in a long term evolution (long term evolution, LTE) system protocol, sCellToAddModListMCG defined in the LTE protocol, and mcg-RB-Config defined in a 5G new radio (new radio, NR) protocol. The configuration information of the SCG includes at least one of the following: scg-RadioConfig defined in the LTE protocol and sourceConfigSCG defined in the NR protocol. The capability information of the UE includes, for example, UECapabilityInformation defined in the LTE or NR protocol.

Usually, the reference configuration information of the SCG may include the capability information of the UE and the configuration information of the MCG. When the SCG changes, for example, when the UE is handed over from the source SN to the target SN while the MN remains unchanged, or in a handover scenario in which both the MN and the SN change, the reference configuration information of the SCG may further carry SCG configuration of a source SN. One objective of providing the reference configuration information of the SCG by the MN is to enable the SN to obtain a reference when configuring the SCG. Both the configuration information of the MCG and the configuration information of the SCG include two parts. For example, for an LTE system, both the configuration information of the MCG and the configuration information of the SCG include configuration information of a PDCP layer and at least one of the following: configuration information of an RLC layer, configuration information of a MAC layer, and configuration information of a PHY layer. For an NR system, both the configuration information of the MCG and the configuration information of the SCG include configuration information (specifically, for example, radioBearerConfig) of SDAP layer and/or PDCP layer and at least one of the following (specifically, for example, CellGroupConfig): the configuration information of the RLC layer, the configuration information of the MAC layer, and the configuration information of the PHY layer. For example, NR is used as an example. Compositions of the reference configuration information of the SCG sent by the CU to the DU may be shown in Table 1.

TABLE 1

| Reference configuration information of an SCG (whose specific form may be, for example, SCG-ConfigInfo) | Configuration information of an MCG (specifically, for example, mcg-RB-Config) | Configuration information of SDAP/PDCP layer (whose specific form may be, for example, radioBearerConfig) Configuration information of RLC/MAC/PHY layer (whose specific form may be, for example, |

TABLE 1-continued

| | CellGroupConfig) |
| Configuration information of an SCG (specifically, for example, sourceConfigSCG) | Configuration information of SDAP/PDCP layer (whose specific form may be, for example, radioBearerConfig) Configuration information of the RLC/MAC/PHY layer (whose specific form may be, for example, CellGroupConfig) |
| Capability information of UE | Whose specific form may be, for example, UECapabilityInformation |

When a protocol version supported by the DU is different from a protocol version corresponding to the configuration information of the SCG sent by the CU, for example, when the protocol version supported by the DU is 3GPP R15, but the protocol version corresponding to the configuration information of the SCG sent by the CU is 3GPP R16 the DU may not correctly obtain, through parsing, the configuration information of the SCG sent by the CU. For example, the DU may obtain, through parsing, most content in the configuration information of the SCG, but cannot correctly obtain, through parsing, an information element newly introduced by the 3GPP R16 protocol version, or the DU cannot obtain, through parsing, some or all of the configuration information of the SCG sent by the CU. The DU supports a limited capability, or there is a difference between the protocol version supported by the DU and the protocol version corresponding to the configuration information of the SCG sent by the CU. Consequently, the DU may not correctly obtain, through parsing, the configuration information of the SCG sent by the CU, and a system error is caused.

In view of this, the following further describes the technical solutions in this application with reference to the accompanying drawings.

Figure 4:
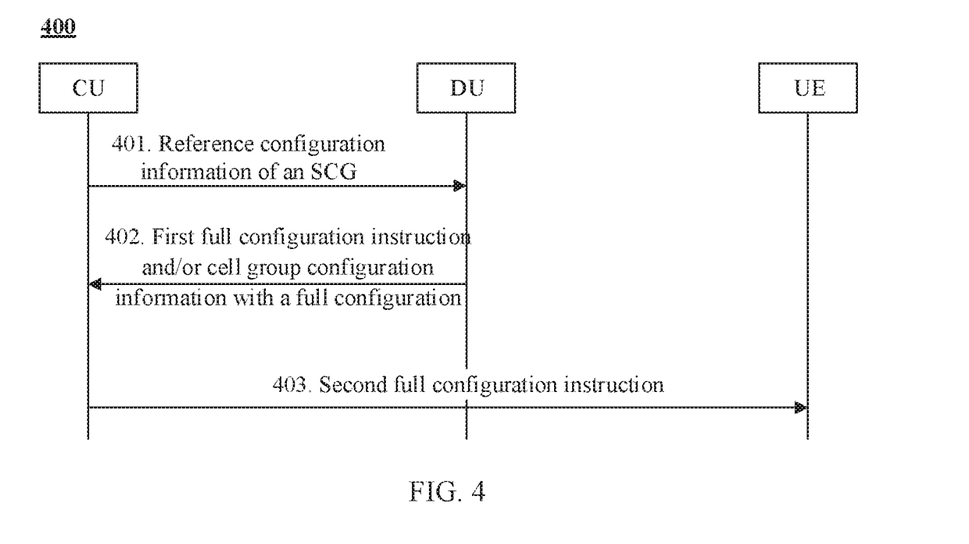
FIG. 4 is a schematic block diagram of a communications system and a communication method according to an embodiment of this application.

As shown in FIG. 4, an embodiment provides a communications system and/or a communication method 400, and the communications system and/or the communication method 400 includes the following operations.

Operation 401: A CU sends reference configuration information of an SCG to a DU.

For example, a specific form of the reference configuration information of the SCG may be SCG-ConfigInfo. For a composition of the reference configuration information of the SCG, may refer to Table 1. For example, the reference configuration information of the SCG may include the configuration information of the SCG and the like.

In an optional design, the CU may carry, in a message sent to the DU, an instruction used to notify that the DU needs to perform full configuration. For example, the CU includes the instruction (which may specifically be a full configuration instruction) in a UE context setup request message (UE context setup request message) and/or a UE context modification request message (UE context modification request message), to instruct the DU to perform the full configuration. For example, when the DU receives the instruction information, the DU is triggered to generate a cell group configuration using full configuration (specifically, for example, CellGroupConfig). This design scheme may be applicable to the following case: When the CU cannot correctly identify the configuration information of the SCG, the CU may determine to generate radio bearer configuration information with a full configuration (specifically, for example, radioBearerConfig). Specifically, the CU may send instruction information to instruct the DU to generate cell group configuration information using full configuration (specifically, for example, CellGroupConfig). This design scheme resolves a problem that a system error is caused because a secondary base station (SN) cannot understand configuration information of a source secondary base station.

It should be noted that all or some content of operation 401 is optional.

Operation 402: The DU sends a first instruction and/or the cell group configuration information using the full configuration to the CU.

In an optional design, if the DU cannot correctly parse the configuration information of the SCG sent by the CU, for example, when a protocol version supported by the DU is 3GPP R15, but a protocol version corresponding to the configuration information of the SCG sent by the CU is 3GPP R16, the DU thus may not correctly parse the configuration information of the SCG sent by the CU. For example, the DU may parse most content in the configuration information of the SCG, but cannot correctly parse an information element newly introduced by the 3GPP R16 protocol version, or the DU cannot parse some or all of the configuration information of the SCG sent by the CU. Optionally, the DU may generate the cell group configuration information with the full configuration (whose specific form may be CellGroupConfig), and send the cell group configuration information with the full configuration to the CU. The cell group configuration information with the full configuration (CellGroupConfig) may specifically include at least one of configuration information of an RLC layer, configuration information of a MAC layer, and configuration information of a PHY layer.

In an optional design, the DU may further generate a first instruction. The first instruction may be used to notify the CU of a status in which the DU has performed the full configuration. The first instruction may be a first full configuration instruction (whose specific form may be full Config). The DU may send the first full configuration instruction to the CU. For example, the DU may carry the first full configuration instruction in a message on the F1 interface or an uplink data packet sent by the DU to the CU, and send the first full configuration instruction to the CU. For example, the DU may carry the first full configuration instruction in at least one of the following types of F1 AP message: a UE context setup response (UE context setup response) message and a UE context modification response (UE context modification response) message. A specific type of message used to send the first full configuration instruction to the CU is not limited herein. This design scheme is applicable to the following case: When the CU sends the reference configuration information of the SCG to the DU, but the DU cannot correctly identify the configuration information of the SCG in the reference configuration information of the SCG, the DU may determine to generate the cell group configuration information using full configuration (specifically, for example, CellGroupConfig). The DU notifies the CU by sending instruction information, so that the CU also generates full configuration-based radio bearer configuration information (specifically, for example, radio-BearerConfig). This helps resolve a problem that a system error is caused because the secondary base station cannot understand the configuration information of the source secondary base station.

In an optional design, the first instruction generated by the DU and the cell group configuration information with the full configuration generated by the DU, may be included in a same message and sent to the CU. Alternatively, the first instruction and the cell group configuration information with the full configuration may be carried in different messages and sent to the CU.

In an optional design, a DU may alternatively be instructed to perform the full configuration via an implicit method. For example, the distributed unit DU (optionally, within a predetermined time) does not receive, from the centralized unit, the configuration information of the secondary cell group SCG, or the distributed unit DU receives the reference configuration information of the secondary cell group SCG from the central unit, but the reference configuration information of the secondary cell group SCG does not include all or some of the configuration information of the secondary cell groups SCGs. In this case, the DU may perform the full configuration operation. Specifically, for example, the DU generates the cell group configuration information using full configuration (specifically, for example, CellGroupConfig). The DU notifies the CU by sending instruction information, so that the CU also generates full configuration-based radio bearer configuration information, and/or the DU sends the cell group configuration information using the full configuration (specifically, for example, CellGroupConfig) to the CU. For another example, if a message (for example, a UE context setup request message) received by the DU includes E-URTAN quality of service (quality of service, QoS) information, the DU may learn that a base station in which the DU is located is in a process of performing EN-DC, and the base station in which the CU-DU is located is a secondary base station. Optionally, in this case, if the DU does not receive the reference configuration information (which may specifically be SCG-ConfigInfo) of the SCG, or the reference configuration information (which may specifically be SCG-Config-Info) of the SCG sent by the CU does not include some or all of SCG configurations, the DU may be triggered to generate the cell group configuration information with a full configuration (CellGroupConfig). For another dual-connectivity or multi-connectivity scenario, for example, a new radio dual connectivity (NR-DC) scenario, a multi-standard/radio dual connectivity (Multi-RAT/Radio Dual Connectivity, MR DC) scenario, an NE-DC scenario, an LTE dual-connectivity (LTE DC) scenario, and another multi-connectivity (Multi-Connectivity) scenario, reference may also be made to the operations provided in this embodiment.

Operation 403: The CU sends a second instruction to UE.

In an optional design, the CU generates full configuration-based radio bearer configuration information (which may specifically be radioBearerConfig). Optionally, the CU may generate the full configuration-based radio bearer configuration information after receiving the first instruction (for example, the first full configuration instruction) sent by the DU. In another optional design, the CU may alternatively determine by itself to generate the full configuration-based radio bearer configuration information. In this case, the DU may not need to send the first instruction to the CU. Specifically, the CU may generate a full configuration-based control message based on the radio bearer configuration information with the full configuration (for example, radio-BearerConfig) and/or the cell group configuration information with the full configuration (for example, CellGroup-Config) from the DU. Optionally, the control message includes the radio bearer configuration information with the full configuration and/or the cell group configuration information with the full configuration from the DU. The control message may be an RRC reconfiguration (which may specifically be RRCreconfiguration) message. Alternatively, the radio bearer configuration information with the full configuration and/or the cell group configuration information with the full configuration from the DU may be sent to the UE by using a control message on an interface between the MN and the SN. The radio bearer configuration information may include at least one of configuration information of SDAP and configuration information of PDCP.

In an optional design, the CU may carry the second instruction in a control message, for example, an RRC reconfiguration (for example, RRCReconfiguration) message. The second instruction may be a second full configuration instruction (which may specifically be fullconfig). Alternatively, the CU may send the second instruction to the UE by using other separate signaling. Optionally, for another example, the CU may send the second instruction to the MN, and the MN sends instruction information to the UE based on the second instruction, so that the UE performs a configuration update operation on the secondary base station. For another example, when the CU is used as a part of the secondary base station SN, the CU may directly send the RRC reconfiguration message to the UE, where the RRC reconfiguration message may include the second instruction, and instruct the UE to perform a configuration update operation on the secondary base station. When the CU is used as a part of the secondary base station SN, the CU may alternatively send the second instruction to the UE by using other signaling, and instruct the UE to perform a configuration update operation on the secondary base station.

When the UE receives the second full configuration instruction, for example, receiving the second full configuration instruction (for example, fullconfig) included in the RRC reconfiguration message, the configuration update operation performed by the UE includes at least one of the following: deleting dedicated configurations other than basic information, such as configurations related to an MCG cell radio network temporary identifier (cell radio network temporary identifier, C-RNTI) and/or MCG security; and enabling a new configuration (for example, a measurement configuration MeasConfig or OtherConfig) in the RRC reconfiguration message. When the RRC reconfiguration message received by the UE does not include the second full configuration instruction (for example, fullconfig), the configuration update operation performed by the UE includes at least one of the following: replacing an old configuration with the new configuration carried in the RRC reconfiguration message. If a part of the old configuration cannot be replaced by the new configuration, for example, some information elements do not exist in the new configuration, the following operations may be specified for the some information elements according to a 3GPP protocol: The UE continues to use a value of a corresponding parameter in the old configuration, and UE behavior remains unchanged, or the UE deletes the parameter and stops related behavior.

In an LTE system, only one air-interface-based full configuration instruction is defined. An air-interface-based full configuration instruction for an SCG configuration (which may specifically be en-DC-release or scg-ConfigReleaseNR) is carried in an EN-DC scenario. A basic meaning of the air-interface-based full configuration instruction for the SCG configuration is similar to that of fullconfig, and a difference lies in that the full configuration instruction for the SCG configuration in the EN-DC scenario is only specific to the SCG configuration. In the EN-DC scenario, after receiving the full configuration instruction for the SCG configuration, the UE may delete dedicated configurations other than basic information of the SCG, for example, SCG C-RNTI or a configuration related to SCG security, and enable the new configuration in the RRC reconfiguration message received by the UE. The UE may alternatively delete all configurations of the SCG, enable the new configuration in the RRC reconfiguration message, and the like. For another dual-connectivity or multi-connectivity scenario, an air-interface-based full configuration instruction for an SCG configuration may further be introduced in the future. This solution is also applicable.

In an optional design, when a gNB including a CU-DU architecture is used as a secondary base station (CU represents that the secondary base station communicates with another network element), the CU sends a third full configuration instruction to the master base station, so that the master base station carries a full configuration instruction of the secondary base station (which may specifically be an en-DC-release instruction or an scg-ConfigReleaseNR instruction) in an RRC reconfiguration message of the master base station.

In an optional design, the CU sends the second instruction and/or the RRC reconfiguration message (carrying the second instruction) to the UE. Specifically, the CU may send the second instruction and/or the RRC reconfiguration message to the UE by using the DU. For example, the CU sends the second instruction and/or the RRC reconfiguration message to the DU through the F1 interface between the CU and the DU. The DU sends the second instruction and/or the RRC reconfiguration message to the UE through the air interface. The DU may send the second instruction and/or the RRC reconfiguration message to the UE without obtaining, through parsing, message content, or by obtaining, through parsing, some of or all of message content, his is not limited herein.

In an optional design, when the base station has the system architecture shown in FIG. 3, that is, the central unit CU includes a central unit control plane (CU-CP) and a central unit user plane (CU-UP), a function of the CU in any one of the embodiment or the designs of the foregoing embodiment may be performed by the CU-CP. An operation between the CU-CP and the DU is similar to the operation between the CU and the DU in any one of the embodiment or the designs of the foregoing embodiment. The following briefly describes the design scheme, and the design scheme includes the following optional operations:

Optional operation 1: The CU-CP sends reference configuration information of an SCG to the DU. For a detailed operation, refer to operation 401.

Optional operation 2: The DU sends a first instruction and/or a cell group configuration with a full configuration to the CU-CP. For a detailed operation, refer to operation 402.

Optional operation 3: The CU-CP sends the reference configuration information of the SCG to the CU-UP.

Based on the system architecture shown in FIG. 3, in an optional design, the CU-CP carries a fourth instruction in an E1 interface message (for example, a UE context setup request message or a UE context modification request message). For example, the fourth instruction may be a fourth full configuration instruction, and the instruction is used to instruct the CU-UP to generate radio bearer configuration information with a full configuration (which may specifically be radioBearerConfig).

Based on the system architecture shown in FIG. 3, in an optional design, the CU-UP may alternatively be instructed, by using an implicit method, to perform full configuration. For example, the CU-CP does not send the reference configuration information (which may specifically be SCG-ConfigInfo) of the SCG, or the reference configuration information (which may specifically be SCG-ConfigInfo) of the SCG sent by the CU-CP does not include some or all of SCG configurations. In this case, the CU-UP may be triggered to perform a full configuration operation. For another example, if a message (for example, a UE context setup request message) received by the CU-UP includes E-UR-TAN quality of service (quality of service, QoS) information, the CU-UP may learn that a base station in which the CP-UP is located performs an EN-DC. The base station in which the CP-UP is located is a secondary base station. Optionally, in this case, if the CP-UP does not receive the reference configuration information (which may specifically be SCG-ConfigInfo) of the SCG, or the reference configuration information (which may specifically be SCG-ConfigInfo) of the SCG sent by the CU-CP does not include some or all of the SCG configurations, the CU-UP may be triggered to generate radio bearer configuration information with a full configuration (which may specifically be radio-BearerConfig).

Optional operation 4: The CU-UP sends radio bearer configuration information with a full configuration (which may specifically be radioBearerConfig) and/or a fifth instruction to the CU-CP. The fifth instruction may be used to notify the CU-CP of a status in which the CU-UP has performed a full configuration. For example, the fifth instruction may be a fifth full configuration instruction (a specific form may be full Config). The CU-UP sends the fifth full configuration instruction to the CU-CP. For example, the CU-UP may carry the fifth full configuration instruction in a message on an E1 interface or an uplink data packet sent by the CU-UP to the CU-CP, and send the fifth full configuration instruction to the CU-CP. For example, the CU-UP may carry the fifth full configuration instruction in at least one of the following types of messages in an E1 AP message: a UE context setup response (UE context setup response) message and a UE context modification response (UE context modification response) message. A specific type of message used to send the fifth full configuration instruction to the CU-CP is not limited herein.

In an optional design, if the CU-UP cannot correctly obtain, through parsing, the configuration information of the SCG from the CU-CP, the CU-UP generates the radio bearer configuration information with the full configuration (for example, radioBearerConfig) specifically including a configuration of SDAP layer and/or a configuration of PDCP layer.

Optional operation 5: The CU-CP sends a second instruction to UE.

In an optional design, the CU-CP generates a full configuration-based control message based on the radio bearer configuration information with the full configuration (for example, radioBearerConfig) sent by the CU-UP, and/or the cell group configuration information with the full configuration (which may specifically be CellGroupConfig) from the DU. The control message may be an RRC reconfiguration (which may specifically be RRCreconfiguration) message. The radio bearer configuration information may include at least one of configuration information of SDAP and configuration information of PDCP. Optionally, the CU-CP generates a full configuration-based control message, for example, an RRC reconfiguration message, after receiving the first instruction (for example, the first full configuration instruction) sent by the DU and/or the fifth instruction (for example, the fifth full configuration instruction) sent by the CU-UP. Optionally, the RRC reconfiguration message includes the radio bearer configuration information with the full configuration sent by the CU-UP and/or the cell group configuration information with the full configuration from the DU. Alternatively, the radio bearer configuration information with the full configuration sent by the CU-UP and/or the cell group configuration information with the full configuration from the DU may be sent to the UE by using a control message on an interface between an MN and an SN.

For another process required in optional operation 5, reference may alternatively be made to operation 403.

In the foregoing embodiment, sequences of the operations are numbered. However, it may be understood that the sequence numbers are only for ease of description, but does not mean that the operations have to be performed based on the sequence numbers. In an optional design, the foregoing operation sequences may change as required. For example, the CU-CP may first interact with the CU-UP, and then interact with the DU. In this case, operation 1, operation 3, operation 4, operation 2, and operation 5. This is not limited herein.

In an optional design, the CU-UP may be physically deployed separately from the CU-CP and the DU, or the CU-UP the CU-CP, and the DU may be deployed in a centralized manner. The following possible cases may exist: For example, all of the CU-CP, the CU-UP, and the DU are deployed separately physically; or the CU-CP and the DU are deployed physically in a centralized manner, but the CU-UP is deployed separately; or the CU-CP and the CU-UP are deployed physically in a centralized manner, but the DU is deployed separately; or the CU-CP is deployed separately, and the CU-UP and the DU may be deployed in a centralized manner.

Any design shown above may be understood as a technical solution designed for a specific scenario or a specific technical problem, but cannot be understood as a necessity for implementing technical content recorded in this application. Any design may be implemented based on a requirement and another design, to resolve a specific objective technical problem more accurately.

In an optional design, in this embodiment of this application, the distributed unit DU has functions of RLC, MAC, and PHY protocol layers, and the central unit CU has functions of RRC, SDAP, and/or PDCP protocol layers. The protocol layers of the DU and the CU together form an RRC protocol layer, an SDAP protocol layer, a PDCP protocol layer, an RLC protocol layer, a MAC protocol layer, and a PHY protocol layer; or an RRC protocol layer, a PDCP protocol layer, an RLC protocol layer, a MAC protocol layer, and a PHY protocol layer of a base station. Certainly, in the base station, protocol layers between the CU and the DU may alternatively be divided in another manner. For example, if the DU has MAC and PHY protocol layers, the CU has RRC, SDAP, PDCP and RLC protocol layers, or RRC, PDCP, and RLC protocol layers. This is not limited herein. Physically, the DU and a radio frequency system may be two parts of one communications device, to implement integration of the two parts. Alternatively, the DU and the CU may physically be used as parts belonging to one communications device, to implement integration of the two parts. Alternatively, a radio frequency system, the DU, and the CU may physically be used as parts belonging to one network node, so that the three parts can be integrated together.

Figure 5:
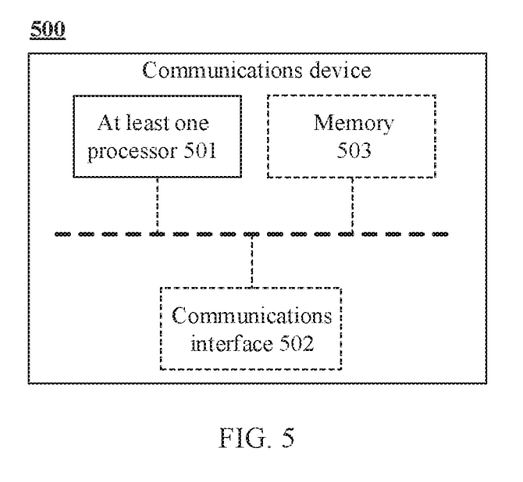
FIG. 5 is a schematic block diagram of a communications device according to an embodiment of this application.

It may be understood that, for the CU, the DU, the CP, and the UP in the foregoing embodiment, the functions of the CU, the DU, the CP, and the UP in any design in the foregoing embodiment of this application are separately implemented by executing a program instruction by using a hardware platform having a processor and a communications interface. Based on this, FIG. 5 is a schematic block diagram of a communications device 500 according to an embodiment of this application. The communications device 500 includes:

at least one processor 501. Optionally, the communications device 500 includes a communications interface 502. The communications interface 502 is configured to support the communications device 500 in performing communication interaction with another device. When a program instruction is executed in the at least one processor 501, in any design in the foregoing embodiment of this application, a function performed on any one of the following devices: the CU, the DU, the CP, and the UP is implemented. In an optional design, the communications device 500 may further include a memory 503, to store a program instruction required for implementing the function of the foregoing device, or process data generated in a program execution process. Optionally, the communications device 500 may further include an internal interconnection line, to implement communication interaction between the at least one processor 501, the communications interface 502, and the memory 503. It may be considered that the at least one processor 501 is implemented by using a dedicated processing chip, a processing circuit, a processor, or a general-purpose chip. For example, all or some of PHY functions of the DU in the embodiments, or all or some of protocol communication functions on the F1 interface or the E1 interface may be implemented by disposing a special-purpose circuit/chip in the at least one processor; or certainly, may be implemented by executing program instructions related to a PHY function and an F1 interface or E1 interface communication function by a general-purpose processor disposed in the at least one processor 501. For another example, all or some of related functions of the MAC layer, the RLC layer, the PDCP layer, the SDAP layer, and the RRC layer of the devices in the embodiments of this application may be implemented by adding a communication processing chip to the at least one processor 501 and by executing program instructions of the related functions of the MAC layer, the RLC layer, the PDCP layer, the SDAP layer, and the RRC layer. It may be understood that the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific application and a design constraint of the technical solutions. For example, in consideration of aspects such as high universality, low costs, and decoupling between software and hardware, these functions may be implemented by executing a program instruction. For another example, in consideration of aspects such as system performance and reliability, these functions may be implemented by using a private circuit. A person of ordinary skill in the art may implement the described functions by using different methods for all particular applications. This is not limited herein.

The communications interface 502 usually has a function of exchanging information between two communications peer ends. When the communications peer ends exchange information in a wired form, the communications interface may be designed as an interface circuit, or a hardware module including an interface circuit, to support communication interaction between the communications peer ends in a wired form. For example, this interface design manner may be used for communication functions of the interface F1 between the DU and the CU and the E1 interface between the CP and the UP in this application. When the communications peer ends exchange information in a wireless form, the communications interface may be an interface circuit having a radio frequency receiving/sending function, or a hardware system including the interface circuit having the radio frequency receiving/sending function. For example, when wireless communication is performed between the DU and UE, this design may be used for a communications interface between the DU and the UE.

Optionally, for implementation of the CU, the DU, the CP, or the UP, the function of the CU, the DU, the CP, or the UP in the designs in this embodiment of this application may alternatively be completed by directly or indirectly executing, by using a universal hardware platform (having a processing resource and a storage resource), a program instruction that can be implemented in a related design of this embodiment. In an actual deployment manner, the CU, the CP, or the UP may be deployed close to or in coordination with a core network device, and may physically be separated or integrated. The function of the CU, the CP, or the UP may alternatively be used as a part of the core network device.

An embodiment of this application further provides a computer program product. The computer program product has a program instruction. When the program instruction is directly or indirectly executed, for example, being executed in the communications device 500 in the foregoing embodiment, a function, on any one of the following devices, in any design of this embodiment of this application: the CU, the CP, the UP, and the DU is implemented. It may be understood that the program instruction may be stored in a computer-readable storage medium or may be transmitted from one computer-readable storage medium to another computer-readable storage medium. For example, the program instruction may be transmitted from one website, computer, server, or data center to another website, computer, server, or data center in a wired (for example, a coaxial cable, an optical fiber, or a digital subscriber line) or wireless (for example, infrared, radio, or microwave) manner. When the program instruction is executed, considering that a hardware layer, an operating system layer running on the hardware layer, and/or an intermediate layer are usually included in a specific network device, when executed, the program instruction related to the embodiments of this application may be usually invoked and executed by software at a plurality of layers. In this case, the program instruction may indicate an indirect execution process in a hardware device (a general-purpose processing circuit or a special-purpose processing circuit).

An embodiment of this application further provides a chip system. The chip system includes at least one processor. When a program instruction is executed in the at least one processor, a function on any one of the following devices in any one of the first aspect or the designs of the first aspect: the CU, the DU, the CP, and the UP is implemented.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by a centralized unit (CU) of a base station to a distributed unit (DU) of the base station, a user equipment (UE) context modification request, the UE context modification request comprises a full configuration indication, the full configuration indication is configured to trigger the DU to generate a cell group configuration using a full configuration of radio configurations in response to determining that configuration information of a secondary cell group (SCG) is absent in a predetermined amount of time, wherein the DU is configured with a radio link control (RLC) layer function, a media access control (MAC) layer function, and a physical (PHY) layer function, and the CU is configured with a radio resource control (RRC) layer function, a service data adaptation protocol (SDAP) layer function, and a packet data convergence protocol (PDCP) layer function, and wherein the configuration information of the SCG comprises an SCG configuration of a source secondary node (SN) in response to determining that a master node remains unchanged and is handed over from the source SN to a target SN; and
receiving, by the CU from the DU, the cell group configuration that is generated using the full configuration of the radio configurations.

2. A communication method, comprising:
receiving, by a distributed unit (DU) of a base station, a user equipment (UE) context modification request from a centralized unit (CU) of the base station, wherein the UE context modification request comprises a full configuration indication, and wherein the DU is configured with a radio link control (RLC) layer function, a media access control (MAC) layer function, and a physical (PHY) layer function, and the CU is configured with a radio resource control (RRC) layer function, a service data adaptation protocol (SDAP) layer function, and a packet data convergence protocol (PDCP) layer function;
determining, by the DU, whether configuration information of a secondary cell group (SCG) is received from the CU, wherein the configuration information of the SCG comprises an SCG configuration of a source secondary node (SN) in response to determining that a master node remains unchanged and is handed over from the source SN to a target SN;
generating, by the DU in response to the full configuration indication and the determining that the configuration information of the SCG is absent in a predetermined amount of time, a cell group configuration using a full configuration of radio configurations; and
sending, by the DU to the CU, the cell group configuration.

3. The method according to claim 2, wherein the configuration information of the SCG comprises configuration information for at least one of a service data adaptation protocol (SDAP) layer, a packet data convergence protocol (PDCP) layer, a radio link control (RLC) layer, a media access control (MAC) layer, or a physical (PHY) layer.

4. The communication method according to claim 2, wherein the DU and the CU are comprised in one base station, the DU comprises: a RLC layer function, a MAC layer function, and a PHY layer function, and
the CU comprises: a RRC layer function, a SDAP layer function, and a PDCP layer function.

5. The method according to claim 2, wherein the configuration information of the SCG comprises an SCG configuration of a source secondary node (SN) in response to determining that a master node and the source SN are changed.

6. The method according to claim 2, further comprising:
determining, by the DU, whether configuration information of a secondary cell group (SCG) is received from the CU; and
wherein the full configuration is performed to generate the cell group configuration in response to determining that the configuration information of the SCG is received from the CU.

7. A communication apparatus, wherein the communication apparatus is a centralized unit (CU) of a base station, comprising:
at least one processor; and
a memory storing computer-executable instructions for execution by the at least one processor to perform operations comprising:
sending to a distributed unit (DU) of the base station, a user equipment (UE) context modification request, wherein the UE context modification request comprises a full configuration indication, the full configuration indication is configured to trigger the DU to generate a cell group configuration using a full configuration of radio configurations in response to determining that configuration information of a secondary cell group (SCG) is absent in a predetermined amount of time, wherein the DU is configured with a radio link control (RLC) layer function, a media access control (MAC) layer function, and a physical (PHY) layer function, and the CU is configured with a radio resource control (RRC) layer function, a service data adaptation protocol (SDAP) layer function, and a packet data convergence protocol (PDCP) layer function, and wherein the configuration information of the SCG comprises an SCG configuration of a source secondary node (SN) in response to determining that a master node remains unchanged and is handed over from the source SN to a target SN; and
receiving, by the CU from the DU, the cell group configuration that is generated using the full configuration of the radio configurations.

8. A communication apparatus, wherein the communication apparatus is a distributed unit (DU) of a base station, comprising:
at least one processor; and
a memory storing computer-executable instructions for execution by the at least one processor to perform operations comprising:
receiving a user equipment (UE) context modification request from a centralized unit (CU) of the base station, wherein the UE context modification request comprises a full configuration indication, wherein the DU is configured with a radio link control (RLC) layer function, a media access control (MAC) layer function, and a physical (PHY) layer function, and the CU is configured with a radio resource control (RRC) layer function, a service data adaptation protocol (SDAP) layer function, and a packet data convergence protocol (PDCP) layer function;
determining, by the DU, whether configuration information of a secondary cell group (SCG) is received from the CU, wherein the configuration information of the SCG comprises an SCG configuration of a source secondary node (SN) in response to determining that a master node remains unchanged and is handed over from the source SN to a target SN;

generating, by the DU in response to the full configuration indication and the determining that the configuration information of the SCG is absent in a predetermined amount of time, a cell group configuration using a full configuration of radio configurations; and sending, by the DU to the CU, at least one of the cell group configuration.

9. The communication apparatus according to claim 8, wherein the configuration information of the SCG comprises configuration information for at least one of a service data adaptation protocol (SDAP) layer, a packet data convergence protocol (PDCP) layer, a radio link control (RLC) layer, a media access control (MAC) layer, or a physical (PHY) layer.

10. The communication apparatus according to claim 8, wherein the DU and the CU are comprised in one base station, the DU comprises: a RLC layer function, a MAC layer function, and a PHY layer function, and the CU comprises: a RRC layer function, a SDAP layer function, and a PDCP layer function.

11. The communication apparatus according to claim 8, wherein the configuration information of the SCG comprises an SCG configuration of a source secondary node (SN) in response to determining that a master node and the source SN are changed.

12. The communication apparatus according to claim 8, further comprising:

determining, whether configuration information of a secondary cell group (SCG) is received from the CU; and wherein the full configuration is performed to generate the cell group configuration in response to determining that the configuration information of the SCG is received from the CU.

* * * * *